G. LAPORTE.
SPRING WHEEL.
APPLICATION FILED AUG. 28, 1916.

1,229,625.

Patented June 12, 1917.
3 SHEETS—SHEET 1.

GEORGES LAPORTE
Inventor

By
Marion & Marion
Attorneys

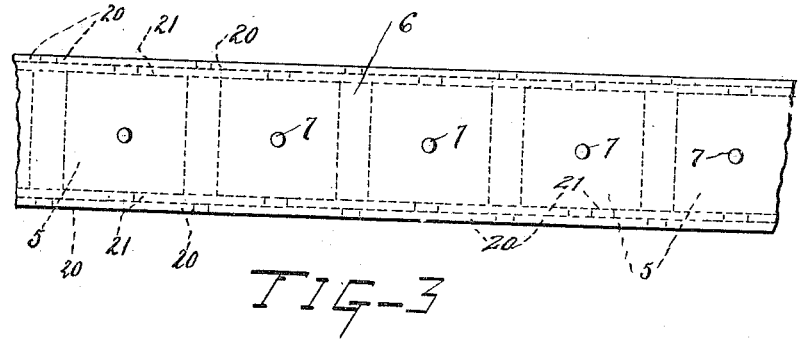
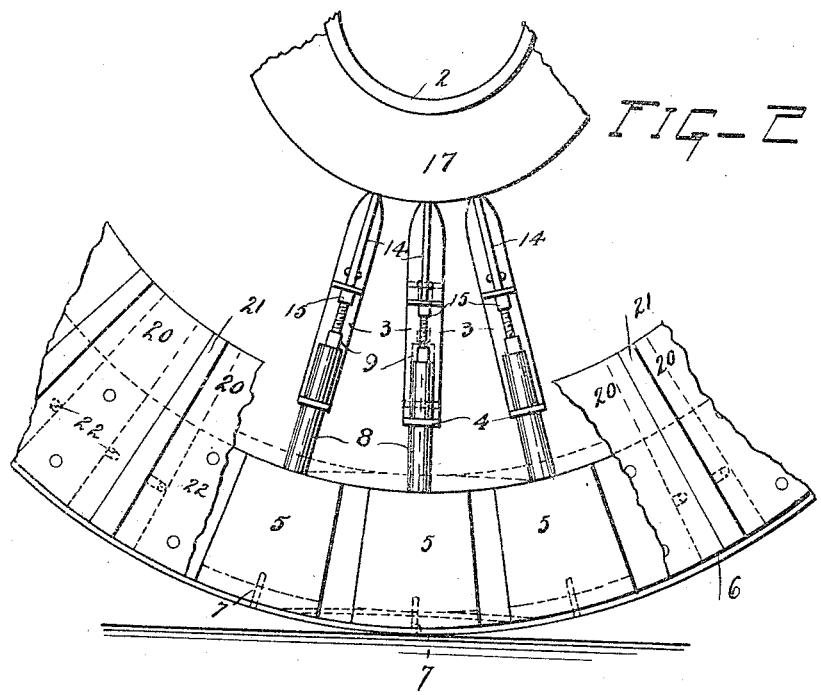

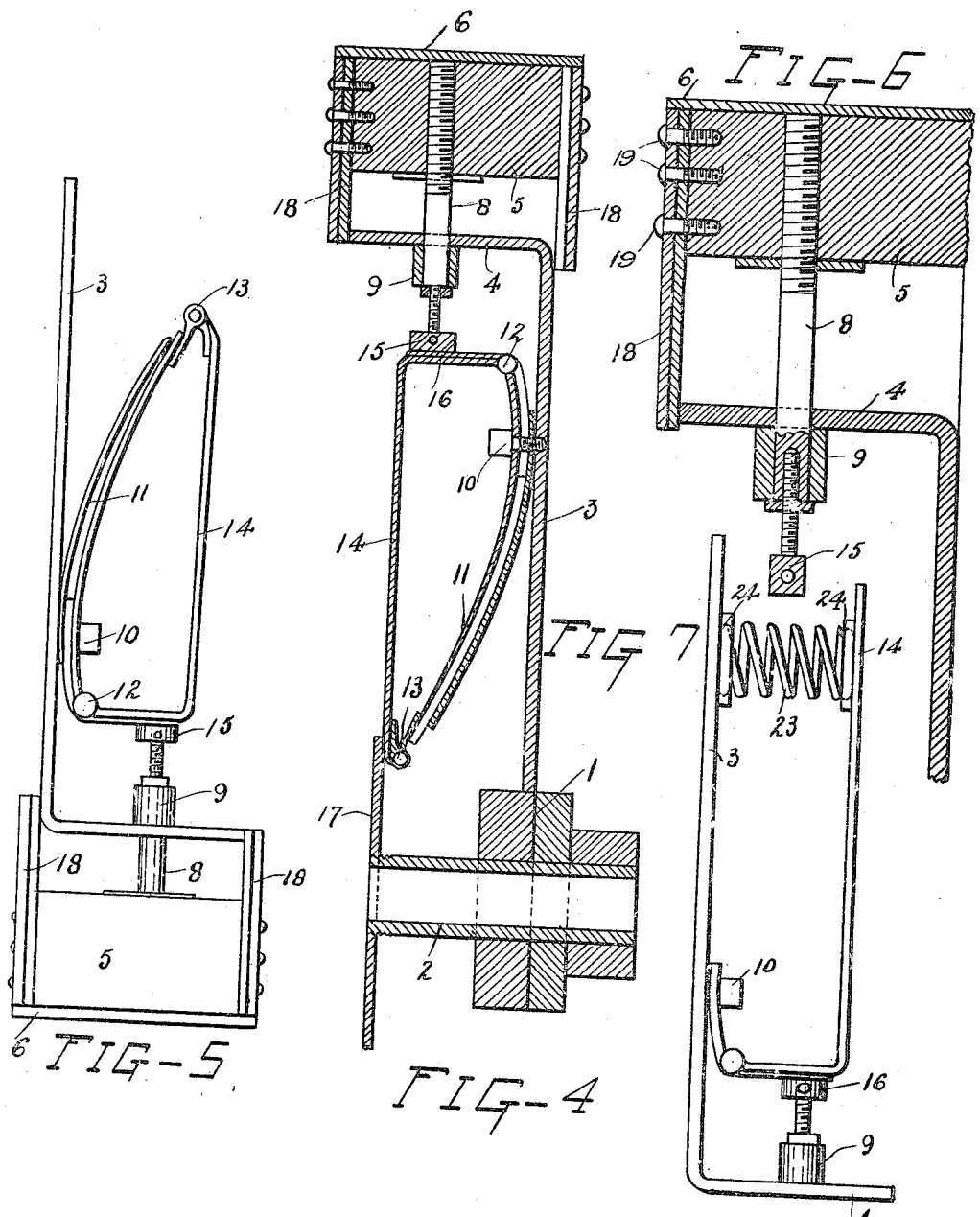

UNITED STATES PATENT OFFICE.

GEORGES LAPORTE, OF HAWKESBURY, ONTARIO, CANADA.

SPRING-WHEEL.

1,229,625.　　　　　Specification of Letters Patent.　　Patented June 12, 1917.

Application filed August 28, 1916.　Serial No. 117,123.

*To all whom it may concern:*

Be it known that I, GEORGES LAPORTE, a subject of the King of Great Britain, residing at Hawkesbury, Province of Ontario, Canada, have invented certain new and useful Improvements in Spring-Wheels; and I do hereby declare that the following is a full, clear, and exact description of the invention, such as will enable others skilled in the art to which it appertains to make and use the same.

The present invention relates to vehicle wheels and more particularly to a spring wheel for vehicles.

An object of the present invention is to provide a wheel of this character with resilient supporting members so as to eliminate the use of pneumatic or rubber tires and to greatly insure the life of the wheel.

With the above and other objects in view which will hereinafter appear as the description continues, the invention consists of the novel features of construction and the formation of parts as will be hereinafter more fully described and particularly pointed out in the appended claims.

In the accompanying drawings is shown the simple and preferred form of the invention it being, however, understood that no limitation is necessarily made to the precise structural details herein exhibited but the right is hereby reserved to any changes or alterations that may be had and come within the scope of the invention without departing from the spirit thereof or sacrificing the efficiency of the same.

In the accompanying drawings;

Fig. 2 is a detail enlarged elevation;

Fig. 3 is a plan view of the rim of the wheel;

Fig. 4 is a vertical section taken on the line 4—4 of Fig. 1;

Fig. 5 is an enlarged detail view showing the parts thereof in elevation;

Fig. 6 is a detail sectional view; and

Fig. 7 is a detail view of another form of a spring used in connection with the wheel.

Referring now more particularly to the accompanying drawings wherein like and corresponding parts are designated by similar reference characters throughout the several views.

Figure 1:
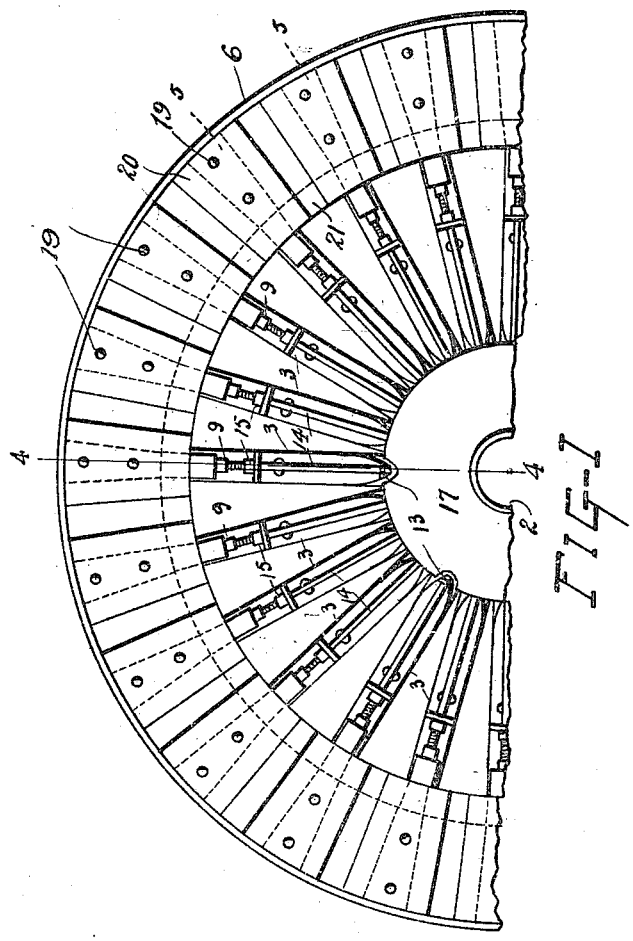
Figure 1 is a front elevation of a portion of the wheel embodying the present invention.

The numeral 1 indicates the hub of a wheel having a bushing 2 which is to be placed over the axles carried by the vehicle. Formed integral with and extending radially upon the hub 1 is a plurality of L shaped supporting spokes, each of which comprises a long arm 3 and a short arm 4 bent at right angles thereto. The felly of the wheel comprises a plurality of blocks 5 equally spaced apart and encircling the blocks 5 is a rim 6 and these blocks are connected to the rim 6 by means of pins or bolts 7.

An externally threaded rod 8 is mounted within each of the blocks 5 and the inner ends of these rods 8 extend through the right angular extending portions 4 of the spokes. A bushing 9 is also rigidly connected to each arm 4 of the spokes and the rods 8 also extend through these bushings 9 and are free to travel therein. Connected to each of the spokes 3 by means of the set screws 10 are the leaf springs 11 and the opposite ends of the leaf springs 11 are pivotally connected as at 12 and 13 to an L shaped bar 14. Adjustably mounted within the inner ends of each of the rods 8 is a lifting jack 15 and the head of this lifting jack normally rests upon the outer face of the short arm 16 formed with the L shaped plate 14.

From the foregoing it is obvious that when weight is applied to the rim of the wheel the same will be transmitted from the blocks 5 to the rods 8 and subsequently carried to the plate 14 through the jack 15 and the leaf springs 11 will take up any irregularities, knocks or jars when the wheel is traveling over the ground. By providing an adjustable jack 15 the tension of the leaf springs may be increased or diminished as the case may require and the parts of the wheel may be easily and readily assembled or disassembled should any of them become worn or broken.

A plate 17 is adjustably mounted upon the bushing 2 and the inner face thereof rests against the inner ends of the plates 14 so as to prevent the same from projecting too far outwardly from the wheel. Secured to the opposite sides of the blocks 5 are a plurality of overlapping plates 18 which are secured to the blocks 5 by means of the set screws 19. The outer plates 20 are rigidly connected to the opposite faces of each block 5 whereas the inner plates 21 connect the adjacent blocks together through the slot and pin connections 22. These side plates prevent any dirt or other foreign matter from accumulating between the blocks 5 and the arms 4 of the spokes so as to permit the same to travel freely to and from each other.

In Fig. 7 of the drawings I have illustrated a slightly modified form of the invention wherein the leaf springs 11 are eliminated and the coiled springs 23 substituted therefor. The opposite ends of the coiled springs 23 are seated within sockets 24 carried by the spokes of the wheel and the inner end of the plate 14 so that when any knocks or jars are transmitted to the plate 14 the same will be taken up by means of the coiled springs 23.

Having thus fully described my invention, what I claim as new and desire to secure by Letters Patent is:

1. A spring wheel comprising a hub, a plurality of spokes carried thereby, a leaf spring carried by each of said spokes, an L shaped bar pivotally connected to the opposite ends of each spring, a felly spaced from said spokes, and means projecting from said felly adapted to rest upon said bars for the purpose set forth.

2. A spring wheel comprising a hub, a plurality of L shaped spokes extending therefrom, leaf springs connected to said spokes, an L shaped bar pivotally connected to the opposite ends of each leaf spring, a felly, said felly comprising a plurality of spaced blocks, a rod extending inwardly from each of said blocks and adapted to extend through said spokes, an adjustable jack carried by each rod for contacting with said L shaped bars, and a plurality of overlapping plates connected to each side of the felly substantially as and for the purpose specified.

3. A spring wheel comprising a hub, a plurality of spokes extending radially therefrom, angular portions formed with the outer ends of said spokes, a felly spaced from said spokes, projections carried by said felly and adapted to extend through said angular portions of the spokes, springs carried by one face of said spokes, a bar pivotally connected to each of said spokes, a connection between one end of said bars and said springs, and said projections carried by the felly adapted to normally rest upon said bars substantially as and for the purpose specified.

In witness whereof I have hereunto set my hand.

GEORGES LAPORTE.

Copies of this patent may be obtained for five cents each, by addressing the "Commissioner of Patents, Washington, D. C."